United States Patent
Sudo et al.

(10) Patent No.: US 11,153,117 B2
(45) Date of Patent: Oct. 19, 2021

(54) ON-BOARD INSTRUMENT, SIGNAL OUTPUT DEVICE, ON-BOARD INSTRUMENT SETTING SYSTEM, AND SIGNAL VALUE INFORMATION ACQUISITION METHOD

(71) Applicant: Mitsubishi Electric Corporation, Tokyo (JP)

(72) Inventors: Akitoshi Sudo, Tokyo (JP); Atsuhiko Nagamune, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/636,086

(22) PCT Filed: Sep. 5, 2017

(86) PCT No.: PCT/JP2017/031965
§ 371 (c)(1),
(2) Date: Feb. 3, 2020

(87) PCT Pub. No.: WO2019/049209
PCT Pub. Date: Mar. 14, 2019

(65) Prior Publication Data
US 2020/0195465 A1    Jun. 18, 2020

(51) Int. Cl.
*H04L 12/403*    (2006.01)
*H04L 12/40*    (2006.01)

(52) U.S. Cl.
CPC .. *H04L 12/403* (2013.01); *H04L 2012/40293* (2013.01)

(58) Field of Classification Search
CPC . H04L 12/403; H04L 12/28; H04L 12/40169; H04L 2012/40293
See application file for complete search history.

(56) References Cited

U.S. PATENT DOCUMENTS

| 4,554,657 A | 11/1985 | Wilson |
| 4,727,539 A * | 2/1988 | Arita ..................... H04L 12/423 370/461 |

(Continued)

FOREIGN PATENT DOCUMENTS

| EP | 169548 A2 | 1/1986 |
| JP | 2006148871 | 6/2006 |

OTHER PUBLICATIONS

International Search Report (PCT/ISA/210), with translation, and Written Opinion (PCT/ISA/237) dated Dec. 12, 2017, by the Japan Patent Office as the International Searching Authority for International Application No. PCT/JP2017/031965.

(Continued)

*Primary Examiner* — Stephen J Clawson
(74) *Attorney, Agent, or Firm* — Buchanan Ingersoll & Rooney PC (57) ABSTRACT

First terminals are usable as input terminals or output terminals and second terminals are usable as input terminals. A switching unit switches the first terminals between input and output, based on an instruction indicating the number of first terminals to be used as output terminals. If at least one first terminal is used as an output terminal, a first signal is output to the first terminals used as output terminals. A storage unit (stores second and third signal values, the second signal value being a value of a second signal input from the input terminal, the third signal value being a value obtained by arraying a plurality of the second signal values based on the value of the first signal. A setting unit reads the second signal value or the third signal value based on the instruction signal, and acquires information on the value of the second signal input.

8 Claims, 6 Drawing Sheets

(56) References Cited

U.S. PATENT DOCUMENTS

| | | | | |
|---|---|---|---|---|
| 5,231,631 | A | * | 7/1993 | Buhrke ............... H04L 12/5602 370/230 |
| 5,235,595 | A | * | 8/1993 | O'Dowd ................. H04L 29/06 370/392 |
| 5,504,741 | A | * | 4/1996 | Yamanaka .......... H04L 12/5601 370/412 |
| 8,953,463 | B2 | * | 2/2015 | Dickey ................ H04L 12/403 370/249 |
| 2003/0212771 | A1 | * | 11/2003 | Kwon ..................... H04L 69/16 709/220 |
| 2004/0098485 | A1 | * | 5/2004 | Larson ............... H04L 63/1458 709/227 |
| 2018/0316520 | A1 | * | 11/2018 | Wijnands .............. H04L 45/745 |
| 2020/0250127 | A1 | * | 8/2020 | Muth ................. H04L 12/4013 |

OTHER PUBLICATIONS

Office Action dated Apr. 15, 2021, by the India Patent Office in corresponding India Patent Application No. 202027005270 and English translation of the Office Action (5 pages).

\* cited by examiner

ON-BOARD INSTRUMENT, SIGNAL OUTPUT DEVICE, ON-BOARD INSTRUMENT SETTING SYSTEM, AND SIGNAL VALUE INFORMATION ACQUISITION METHOD

FIELD

The present invention relates to an on-board instrument mounted on a train, a signal output device, an on-board instrument setting system, and a signal value information acquisition method.

BACKGROUND

In a conventional system that connects on-board instruments to a network in railroad cars, identification numbers that are based on train numbers, car numbers, and instrument numbers are assigned to on-board instruments (Patent Literature 1). Thus, when a failure occurs in any of the on-board instruments, the identification numbers can be used to easily identify which on-board instrument is out of order.

CITATION LIST

Patent Literature

Patent Literature 1: Japanese Patent Application Laid-open No. 2006-148871

SUMMARY

Technical Problem

Unfortunately, according to the above conventional technique, the number of bits that can be used for instrument numbers is determined in advance, in recent years, the number of on-board instruments mounted on cars such as display devices has been increasing. Therefore, if the number of on-board instruments mounted on cars exceeds the number representable by the number of bits that can be used for instrument numbers, identification information cannot be assigned to the on-board instruments, which is problematic. This problem can be addressed by increasing the number of bits that can be used in an on-board instrument as its instrument number. However, in order to increase the number of bits for use in an on-board instrument, it is necessary to increase the number of terminals of the on-board instrument that capture the value of each bit. Increasing the number of terminals requires large components such as connectors, resulting in an increase in the mounting area and the size of the on-board instrument, which is also problematic.

The present invention has been made in view of the above, and an object thereof is to provide an on-board instrument capable of increasing the number of bits of information to be used without increasing the number of terminals that capture the value of each bit.

Solution to Problem

To solve the problem and achieve the object, an on-board instrument according to the present invention comprises: a variable terminal group including one or more first terminals each usable as an input terminal, or an output terminal and one or more second terminals each usable as an input terminal; a switching unit to switch the first terminals to the input terminal or the output terminal; a setting unit to control the switching unit on a basis of an instruction signal indicating the number of first terminals to be used as the output terminal, and if at least one of the first terminals is used as the output terminal, output a first signal to the first terminal that is used as the output terminal via the switching unit; and a storage unit capable of storing a second signal value and a third signal value, the second signal value being a signal value of a second signal input from the input terminal, the third signal value being a signal value obtained by arraying a plurality of the second signal values on the basis of a first signal value that is a signal value of the first signal, wherein the setting unit reads the second signal value or the third signal value from the storage unit on the basis of the instruction signal, and acquires information on the signal value of the second signal input.

Advantageous Effects of Invention

According to the present invention, an on-board instrument can achieve the effect of increasing the number of bits of information to be used without increasing the number of terminals that capture the value of each bit.

DESCRIPTION OF EMBODIMENTS

Hereinafter, an on-board instrument, a signal output device, an on-board instrument setting system, and a signal value information acquisition method according to an embodiment of the present invention will be described in detail based on the drawings. The present invention is not limited to the embodiment.

Embodiment

Figure 1:
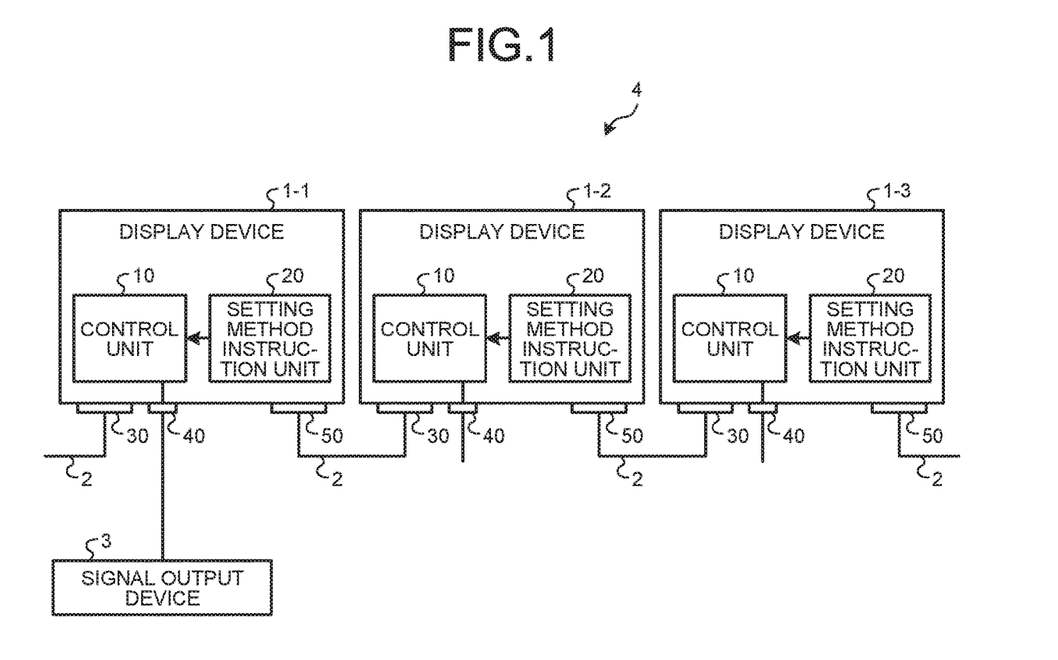
FIG. 1 is a diagram illustrating an exemplary configuration of an on-board instrument setting system.

FIG. 1 is a diagram illustrating an exemplary configuration of an on-board instrument setting system 4 according to an embodiment of the present invention. The on-board instrument setting system 4 includes display devices 1-1 to 1-3 and a signal output device 3. The display devices 1-1 to 1-3 are on-board instruments mounted on a train (not illustrated). The display devices 1-1 to 1-3 belong to a display system in the train. The display devices 1-1 to 1-3 are connected to one another via cables 2. The display system in the train is a system that transmits data such as display data from a terminal device (not illustrated) mounted on each car to the display devices 1-1 to 1-3 using Ethernet (registered trademark) communication, for example. The display devices 1-1 to 1-3 may be referred to as the display device(s) 1 when they not distinguished. In FIG. 1, the number of display devices 1 is three, which is only an example. The number of display devices 1 may be two or may be four or more. In the on-board instrument setting system 4 illustrated in FIG. 1, the display devices 1 are connected in the form of a daisy chain, which is only an example. The method of connecting the display devices 1 is not limited to this. In the on-board instrument setting system 4, the display devices 1 may be connected to one another via a relay device (not illustrated).

The display device 1 is connected to the cables 2 by a connector 30 and a connector 50 and is connected to the adjacent display devices 1 via the cables 2. The display device 1 is connected to the signal output device 3 by a connector 40. The signal output device 3 outputs a second digital signal (hereinafter referred to as a second signal) to the display device 1. In response to receiving a first digital signal (hereinafter referred to as a first signal) from the display device 1, the signal output device 3 generates a second signal on the basis of the number of streams of the first signal input and the signal value of the first signal, and outputs the second signal to the display device 1. The display device 1 can receive a second signal from the signal output device 3 and output a first signal to the signal output device 3. Using the second signal input from the signal output device 3, the display device 1 sets identification information for identifying the display device 1. As described above, identification information is information including a train number, a car number, and an instrument number. Hereinafter, an exemplary case in which the display device 1 sets its instrument number, using a second signal from the signal output device 3 will be described in detail. Note that the display device 1 can also set a train number and a car number in the same manner as the display device 1 sets its instrument number. The description of the present embodiment is based on the assumption that the display device 1 includes eight terminals that can be used as Digital-In (DI), and that the number of bits to be used for the instrument number may be more than eight. When the number of bits to be used for the instrument number is eight or less, the display device 1 can also set the instrument number with a conventional method without using the signal output device 3.

Although FIG. 1 is a simplified diagram, second signals of up to 8 bits from the signal output device 3 are received in parallel by the display devices 1. The display device 1 includes eight terminals that can be used as DI, and one or more of the eight terminals can be used as Digital-Out (DO). DI is an input terminal of the display device 1, and DO is an output terminal of the display device 1. In other words, the display device 1 can allocate, to DO, one or more of the eight bits that can be used as DI. On the basis of an instruction signal from a setting method instruction unit 20, a control unit 10 of the display device 1 determines the terminal(s) to be used as DO and the terminals to be used as DI from the eight terminals. An instruction signal indicates the number of terminals to be used as DO out of the eight terminals. The setting method instruction unit 20 may accept settings from a user through a switch or the like to generate and output an instruction signal, or may output the instruction signal designated in the manufacturing stage of the display device 1. The setting method instruction unit 20 may be a small instrument that is removably attached to the display device 1, and may be configured such that upon attachment to the display device 1, the setting method instruction unit 20 outputs the instruction signal set by a user.

Figure 2:
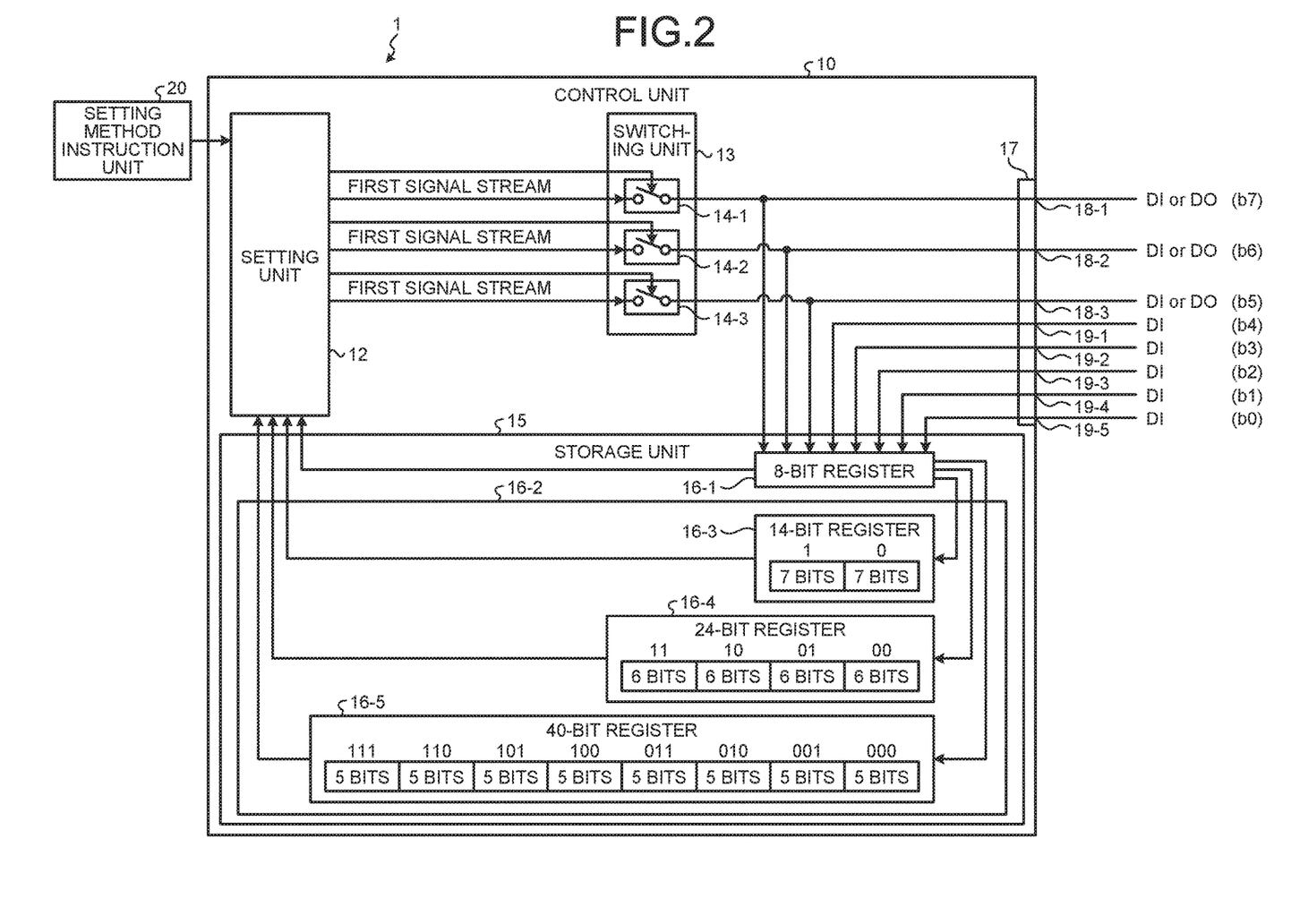
FIG. 2 is a block diagram illustrating an exemplary configuration of a display device.

The configuration of the display device 1 will be described. FIG. 2 is a block diagram illustrating an exemplary configuration of the display device 1 according to the present embodiment. The display device 1 includes the control unit 10 and the setting method instruction unit 20. The control unit 10 includes a setting unit 12, a switching unit 13, a storage unit 15, and a variable terminal group 17.

The variable terminal group 17 includes a total of eight terminals: terminals 18-1 to 18-3; and terminals 19-1 to 19-5. The terminals 18-1 to 18-3 are first terminals that can be used as DI or DO. The terminals 19-1 to 19-5 are second terminals that can be used as DI. Here, out of the eight terminals of the variable terminal group 17, the three terminals 18-1 to 18-3 corresponding to the upper three bits are first terminals, and the five terminals 19-1 to 19-5 corresponding to the lower five bits are second terminals. Specifically, the terminal 18-1 corresponds to the most significant, or uppermost bit (b7), the terminal 18-2 corresponds to the bit (b6), and the terminal 18-3 corresponds to the bit (b5). The terminal 19-1 corresponds to the bit (b4), the terminal 19-2 corresponds to the bit (b3), the terminal 19-3 corresponds to the bit (b2), the terminal. 19-4 corresponds to the bit (b1), and the terminal 19-5 corresponds to the least significant, or lowermost bit (b0). The terminals 18-1 to 18-3 are referred to as the terminal(s) 18 when they are not distinguished, and the terminals 19-1 to 19-5 are referred to as the terminal(s) 19 when they are not distinguished. The number of first terminals and second terminals is not limited to that of the example of FIG. 2 as long as one or more first terminals and one or more second terminals are provided. However, if the variable terminal group 17 includes two terminals one of which is used as DO, its effect is equivalent to the effect of using the two terminals as DI, and no advantage can be obtained. Therefore, the number of terminals of the variable terminal group 17 is preferably three or more. The number of terminals of the variable terminal group 17 is not limited to eight. Note that the number of terminals of the variable terminal group 17 is also referred to as the number of contacts. In this case, the number of contacts of the variable terminal group 37 is eight.

Under the control of the setting unit 12, the switching unit 13 switches the terminals 18-1 to 18-3, namely the first terminals, of the variable terminal group 17 to DI or DO. The switching unit 13 includes switches 14-1 to 14-3. The switch 14-1 switches the use of the terminal 18-1 to the use as DI or DO under the control of the setting unit 12. The setting unit 12 closes the switch 14-1 when the terminal 18-1 is used as DO. The switch 14-2 switches the use of the terminal 18-2 to use as DI or DO under the control of the setting unit 12. The setting unit 12 closes the switch 14-2 when the terminal 18-2 is used as DO. The switch 14-3 switches the use of the terminal 18-3 to use as DI or DO under the control of the setting unit 12. The setting unit 12 closes the switch 34-3 when the terminal 18-3 is used as DO. The switches 14-1 to 14-3 are referred to as the switch(es) 14 when they are not distinguished. The switching unit 13 outputs the first signal input from the setting unit 12 to the terminal(s) 18 and the storage unit 15.

The storage unit 15 includes a first storage unit 16-1 and a second storage unit 16-2. The first storage unit 16-1 is an 8-bit register that can store the signal value of a signal of eight bits equal to the total number (eight) of first and second terminals of the variable terminal group 17. The signal value of an 8-bit signal is a combination of the signal value of a first signal and the signal value of a second signal or consists of only the signal value of a second signal. Hereinafter, the signal value of a first signal may be referred to as a first signal value. The signal value of a second signal may be referred to as a second signal value. When a first signal is not input from the switching unit 13, the first storage unit 16-1 stores the signal value of the second signal input from the signal output device 3 to the DI of the variable terminal group 17 of the display device 1. In contrast, when a first signal is input from the switching unit 13, the first storage unit 16-1 stores the signal value of the first signal input from the switching unit 13 and the signal value of the second signal input from the signal output device 3 to the DI of the variable terminal group 17 of the display device 1. For example, when all the eight terminals of the variable terminal group 17 are DI, the first storage unit 16-1 stores an 8-bit second signal value. When one of the eight terminals 18 of the variable terminal group 17 is DO and the other seven terminals are DI, the first storage unit 16-1 stores a 1-bit first signal value and a 7-bit second signal value. When two of the eight terminals 18 of the variable terminal group 17 are DO and the other six terminals are DI, the first storage unit 16-1 stores a 2-bit first signal value and a 6-bit second signal value. When three of the eight terminals 18 of the variable terminal group 17 are DO and the other five terminals 19 are DI, the first storage unit 16-1 stores a 3-bit first signal value and a 5-bit second signal value.

When one or more of the eight terminals 18 of the variable terminal group 17 are used as DO, the second storage unit 16-2 stores a third signal value using a plurality of second signal values stored in the first storage unit 16-1 at different timings, that is, a plurality of second signal values stored in the first storage unit 16-1 together with different first signal values. A third signal value is a signal value obtained by arraying second signal values at designated positions in the second storage unit 16-2 in accordance with the signal value of the first signal input from the switching unit 13. The second storage unit 16-2 further includes a number of storage units corresponding to the number of terminals 18 used as DO. Specifically, the second storage unit 16-2 includes a third storage unit 16-3 that stores a 14-bit third signal value, a fourth storage unit 16-4 that stores a 24-bit third signal value, and a fifth storage unit 16-5 that stores a 40-bit third signal value.

The third storage unit 16-3 stores a 14-bit third signal value when one terminal 18 of the variable terminal group 17 is used as DO. The third storage unit 16-3 is a 14-bit register that stores a third signal value of 14 ($7\times2^1$) bits, i.e. a combination of 7-bit second signal values for the first signal values "0" and "1". In the third storage unit 16-3, as illustrated in FIG. 2, the array of 7-bit second signal values corresponding to the respective first signal values is predetermined by the first signal values "0" and "1".

The fourth storage unit 16-4 stores a 24-bit third signal value when two terminals 18 of the variable terminal group 17 are used as DO. The fourth storage unit 16-4 is a 24-bit register that stores a third signal value of 24 ($6\times2^2$) bits, i.e. a combination of 6-bit second signal values for the first signal values "00", "01", "10", and "11". In the fourth storage unit 16-4, as illustrated in FIG. 2, the array of 6-bit second signal values corresponding to the respective first signal values is predetermined by the first signal values "00", "01", "10", and "11".

The fifth storage unit 16-5 stores a 40-bit third signal value when three terminals 18 of the variable terminal group 17 are used as DO. The fifth storage unit 16-5 is a 40-bit register that stores a third signal value of 40 ($5\times2^3$) bits, i.e. a combination of 5-bit second signal values for the first signal values "000", "001", "010", "011", "100", "101", "110", and "111". In the fifth storage unit 16-5, as illustrated in FIG. 2, the array of 5-bit second signal values corresponding to the respective first signal values is predetermined by the first signal values "000", "001", "010", "011", "100", "101", "110", and "111".

In the second storage unit 16-2, the third storage unit 16-3, the fourth storage unit 16-4, and the fifth storage unit 16-5 are not used at the same time. One of the storage units 16-3 to 16-5 is used according to the number of terminals 18 used as DO in the variable terminal group 17.

Note that the configuration of the second storage unit 16-2 illustrated in FIG. 2 is only an example, and the present invention is not limited to this. The second storage unit 16-2 may include only one storage unit, instead of a number of storage units corresponding to the number of terminals 18 used as DO. For example, when the number of terminals 18 that can be used as DO in the display device 1 is three as illustrated in FIG. 2, the second storage unit 16-2 includes one sixth storage unit (not illustrated) that can store a signal value of 40 bits or more. The second storage unit 16-2 arrays and stores second signal values from the lower side of the sixth storage unit in accordance with first signal values, and sets the unused portion of the sixth storage unit to "0". Specifically, suppose that the sixth storage unit is a 64-bit register capable of storing a 64-bit third signal value. When one terminal 18 of the variable terminal group 17 is used as DO, the second storage unit 16-2 stores a third signal value of 14 ($7\times2^1$) bits on the lower side of the sixth storage unit, and sets the upper 50 bits of the sixth storage unit to "0". The array of 7-bit second signal values in the sixth storage unit may be the same as that in the example of the third storage unit 16-3 illustrated in FIG. 2. When two terminals 18 of the variable terminal group 17 are used as DO, the second storage unit 16-2 stores a third signal value of 24 ($6\times2^2$) bits on the lower side of the sixth storage unit, and sets the upper 40 bits of the sixth storage unit to "0". The array of 6-bit second signal values in the sixth storage unit may be the same as that, in the example of the fourth storage unit 16-4 illustrated in FIG. 2. When three terminals 18 of the variable terminal group 17 are used as DO, the second storage unit 16-2 stores a third signal value of 40 ($5\times2^3$) bits on the lower side of the sixth storage unit, and sets the upper 24 bits of the sixth storage unit to "0". The array of 5-bit second signal values in the sixth storage unit may be the same as that in the example of the fifth storage unit 16-5 illustrated in FIG. 2.

In a case where the second storage unit 16-2 includes the sixth storage unit, when the number of terminals used as DO in the variable terminal group 17 is "0", that is, when all the eight terminals are used as DI, the 8-bit second signal value stored in the first storage unit 16-1 may be stored as the third signal value.

The setting unit 12 determines, from the instruction signal input from the setting method instruction unit 20, the number of first terminals 18 to be used as CO, that is, the number of bits. The setting unit 12 controls the switching unit 13 on the basis of the determination result, that is, the instruction signal. Specifically, when at least one terminal 18 is to be used as CO, the setting unit 12 closes the switch 14 of the switching unit 13 connected to the terminal 18 that is used as CO. When at least one terminal 18 is to be used as DO, the setting unit 12 outputs a first signal to the terminal 18 that is used as DO via the switching unit 13, more specifically, the closed switch 14. The setting unit 12 switches the signal value of the first signal for output after the lapse of a predetermined time. When at least one terminal 18 is to be used as DO, the setting unit 12 controls the switching unit 13 for switching to CO in order from the terminal 18 corresponding to the most significant bit, namely the terminal 18-1. Specifically, in order to use one terminal 18 as DO, the setting unit 12 selects the terminal 18-1 as the terminal 18 that is used as DO. In order to use two terminals 18 as DO, the setting unit 12 selects the terminals 18-1 and 18-2 as the terminals 18 that are used as DO. In order to use three terminals 18 as DO, the setting unit 12 selects the terminals 18-1 to 18-3 as the terminals 18 that are used as DO. The setting unit 12 also reads the second signal value or the third signal value from the storage unit 15 on the basis of the instruction signal, and acquires information on the signal value of the second signal input from the signal output device 3 to the display device 1. Specifically, if the instruction signal indicates that no terminal 18 is used as DO, the setting unit 12 reads the second signal value from the first storage unit 16-1. If the instruction signal indicates that at least one terminal 18 is used as DO, the setting unit 12 reads the third signal value from the second storage unit 16-2. The setting unit 12 sets identification information using the read signal value, that is, information on the signal value of the second signal input from the signal output device 3 to the display device 1. In a case where the second storage unit 16-2 of the storage unit 15 includes the sixth storage unit and an 8-bit second signal value is stored as the third signal value in the sixth storage unit, the setting unit 12 may read the third signal value from the sixth storage unit of the second storage unit 16-2 regardless of the number of terminals 18 used as DO. In this case, on the basis of the instruction signal, that is, the number of terminals 18 used as DO, the setting unit 12 reads, from the sixth storage unit of the second storage unit 16-2, the third signal value of the lower 8 bits, the third signal value of the lower 14 bits, the third signal value of the lower 24 bits, or the third signal value of the lower 40 bits.

In the display device 1, the number of first terminals that can be used as DI or DO is three, which is only an example. The present invention is not limited to this. In the display device 1, the number of first terminals 18 that can be used as DI or DO is equal to the number of switches 14 of the switching unit 13. In a case where the second storage unit 16-2 includes a number of storage units corresponding to the number of terminals 18 used as DO, the number of storage units in the second storage unit 16-2 is equal to the number of terminals 18 and the number of switches 14 of the switching unit 13.

Figure 3:
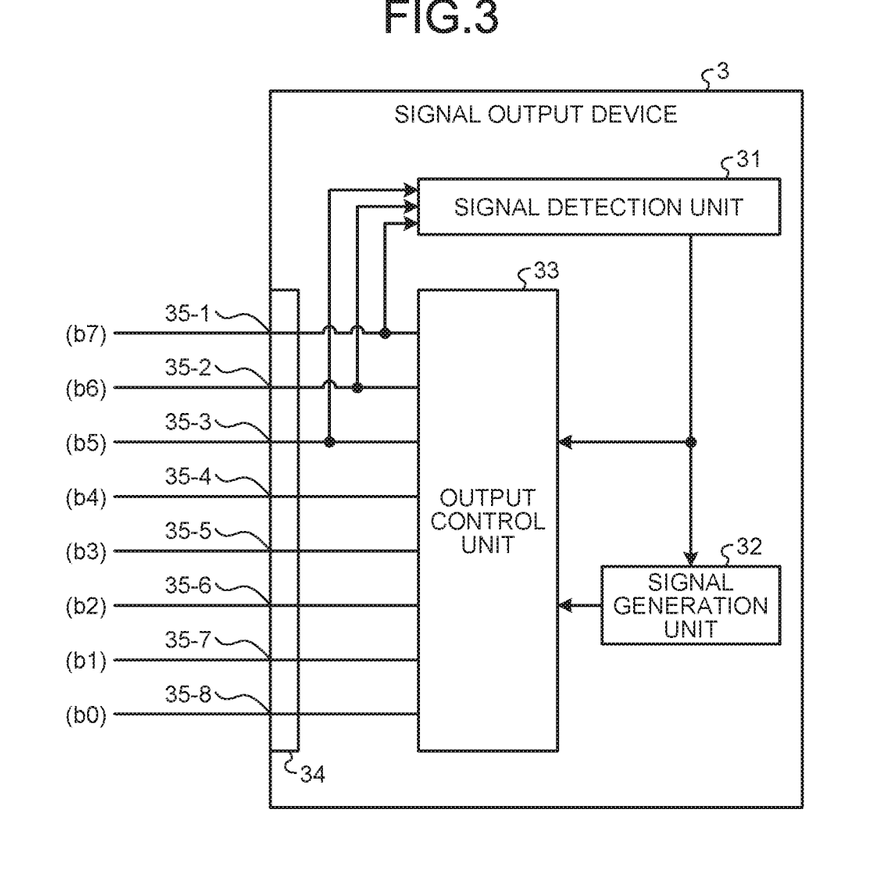
FIG. 3 is a block diagram illustrating an exemplary configuration of a signal output device.

Next, the configuration of the signal output device 3 will be described. FIG. 3 is a block diagram illustrating an exemplary configuration of the signal output device 3 according to the present embodiment. The signal output device 3 includes a signal detection unit 31, a signal generation unit 32, an output control unit 33, and a terminal group 34.

The terminal group 34 includes a total of eight terminals 35-1 to 35-8. Here, the terminal 35-1 corresponds to the bit (b7). The terminal 35-2 corresponds to the bit (b6). The terminal 35-3 corresponds to the bit (b5). The terminal 35-4 corresponds to the bit (b4). The terminal 35-5 corresponds to the bit (b3). The terminal 35-6 corresponds to the bit (b2). The terminal 35-7 corresponds to the bit (b1). The the terminal 35-8 corresponds to the bit (b0). The terminals 35-1 to 35-8 of the signal output device 3 are connected in a one-to-one correspondence to the terminals 18-1 to 18-3 and 19-1 to 19-5 of the same bit positions in the display device 1, respectively.

After a first signal is output from the display device 1, the signal detection unit 31 detects the first signal at the terminals 35-1 to 35-3 of the terminal group 3-1. Specifically, the signal detection unit 31 detects the number of streams of the first signal and the signal value of the first signal. The signal detection unit 31 detects the first signal output in one stream from the display device 1 at the terminal 35-1 corresponding to the bit (b7). The signal detection unit 31 detects the first signal output in two streams from the display device 1 at the terminal 35-1 corresponding to the bit (b7) and the terminal 35-2 corresponding to the bit (b6). The signal detection unit 31 detects the first signal output in three streams from the display device 1 at the terminal 35-1 corresponding to the bit (b7), the terminal 35-2 corresponding to the bit (b6), and the terminal 35-3 corresponding to the bit (b5).

On the basis of the detection result of the signal detection unit 31, specifically the number of streams of the first signal, the signal generation unit 32 determines the number of bits of the second signal to be output from the signal output device 3 to the display device 1, that is, the number of streams of the second signal to be generated. The signal generation unit 32 also determines the signal value of each bit of the second signal for each signal value of the first signal detected by the signal detection unit 31, and generates the second signal for each signal value of the first signal. Specifically, when a first signal is not input from the display device 1, the signal generation unit 32 generates one pattern of an 8-bit second signal. When a first signal is input from the display device 1 in one stream, the signal generation unit 32 generates two ($2^1$) patterns of a 7-bit second signal in accordance with each signal value of the first signal. When a first signal is input from the display device 1 in two streams, the signal generation unit 32 generates four ($2^2$) patterns of a 6-bit second signal in accordance with each signal value of the first, signal. When a first signal is input from the display device 1 in three streams, the signal generation unit 32 generates eight ($2^3$) patterns of a 5-bit second signal in accordance with each signal value of the first signal. When the signal generation unit 32 generates a plurality of patterns of a second signal, some of the patterns of the second signal may have the same signal value. The signal generation unit 32 may automatically generate the signal value of a second signal, or may accept an operation from a user to generate the signal value of a second signal.

The output control unit 33 outputs the second signal generated by the signal generation unit 32 to the display device 1 via the terminal group 34 on the basis of the detection result of the signal detection unit 31. Specifically, the output control unit 33 performs control to output the second signal generated by the signal generation unit 32 from the terminals other than the terminal(s) at which the signal detection unit 31 has detected the first signal. When an 8-bit second signal is generated by the signal generation unit 32, the output control unit 33 performs control to output the 8-bit second signal, using the eight terminals 35-1 to 35-8 of the terminal group 34. When a 7-bit second signal is generated by the signal generation unit 32, the output control unit 33 performs control to output the 7-bit second signal by switching the signal value of the 7-bit second signal in accordance with the signal value of the first signal, using the seven terminals 35-2 to 35-8 of the terminal group 34. When a 6-bit second signal is generated by the signal generation unit 32, the output control unit 33 performs control to output the 6-bit second signal by switching the signal value of the 6-bit second signal in accordance with the signal value of the first signal, using the six terminals 35-3 to 35-8 of the terminal group 34. When a 5-bit second signal is generated by the signal generation unit 32, the output control unit 33 performs control to output the 5-bit second signal by switching the signal value of the 5 bit second signal in accordance with the signal value of the first signal, using the five terminals 35-4 to 35-8 of the terminal group 34.

Figure 4:
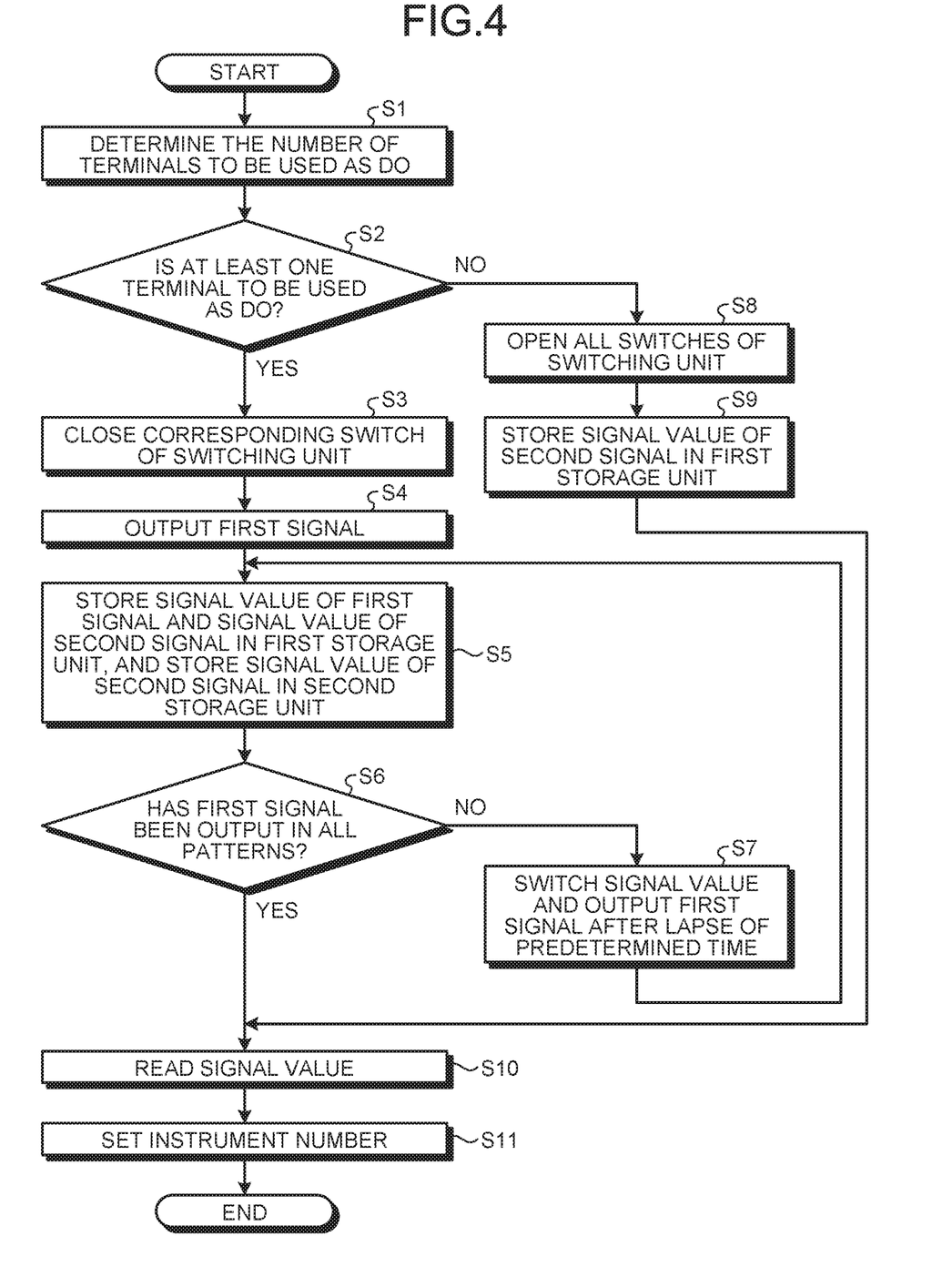
FIG. 4 is a flowchart illustrating an operation in which a display device sets its instrument number.

Next, an operation in which the display device 1 sets the instrument number of identification information will be described. FIG. 4 is a flowchart illustrating an operation in which the display device 1 according to the present embodiment sets its instrument number. First, the setting method instruction unit 20 of the display device 1 outputs, to the control unit 10, an instruction signal indicating the number of terminals to be used as DO out of the eight terminals of the variable terminal group 17. On the basis of the instruction signal from the setting method instruction unit 20, the setting unit 12 of the control unit 10 determines the number of bits of DO, that is, the number of terminals to be used as DO in the variable terminal group 17 (step S1).

If the instruction signal indicates that at least one terminal 18 is to be used as DO in the variable terminal group 17 (step S2: Yes), the setting unit 12 closes the switch 14 of the switching unit 13 connected to the terminal 18 that is used as DO (step S3). Specifically, when one terminal 18 is to be used as DO in the variable terminal group 17, the setting unit 12 closes the switch 14-1 and opens the switches 14-2 and 14-3. When two terminals 18 are to be used as DO in the variable terminal group 17, the setting unit 12 closes the switches 14-1 and 14-2 and opens the switch 14-3. When three terminals 18 are to be used as DO in the variable terminal group 17, the setting unit 12 closes the switches 14-1 to 14-3.

The setting unit 12 outputs a first signal via the closed switch 14 to the terminal 18 connected to the closed switch 14, and the terminal 18 outputs the first signal to the signal output device 3 (step S4). Note that the setting unit 12 can determine whether the signal output device 3 is connected to the display device 1, by checking the state, i.e. voltage value, of the terminal 18 that outputs the first signal. When the first signal is input from the switching unit 13, that is, the switch 14, the storage unit 15 stores, in the first storage unit 16-1, the signal value of the input first signal and the signal value of the second signal input from the signal output device 3 after the first signal, and stores the signal value of the input second signal in the array portion of the second storage unit 16-2 corresponding to the first signal value (step S5). The setting unit 12 checks whether the first signal has been output in all patterns that can be set as the signal value of the first signal (step S6). If at least one signal value pattern of the first signal has not been output (step S6: No), the setting unit 12 switches the signal value and outputs the first signal after the lapse of a predetermined time (step S7). Thereafter, the control unit 10 returns to step S5 and performs the above-described operation.

Here, steps S4 to S7 will be described in detail. Referring to steps S4, S6, and S7, if the setting unit 12 closes the switch 14-1, the setting unit 12 outputs a first signal to the terminal 18-1 via the switch 14-1. First, the setting unit 12 outputs the first signal with the signal value "0", and after the lapse of a predetermined time, switches the signal value and outputs the first signal with the signal value "1". The setting unit 12 may output the first signal with the signal values "0" and "1" only once or repeatedly.

If the setting unit 12 closes the switches 14-1 and 14-2, the setting unit 12 outputs a first signal in two streams to the terminal 18-1 via the switch 14-1 and to the terminal 18-2 via the switch 14-2. In the following detailed description, the phrase "via the switch 14" is omitted for the sake of brevity. First, the setting unit 12 outputs a first signal stream with the signal value "0" to the terminal 18-1 and outputs a first signal stream with the signal value "0" to the terminal 18-2. After the lapse of a predetermined time, the setting unit 12 outputs the first signal stream with the signal value "0" to the terminal 18-1 and outputs the first signal stream with the signal value "1" to the terminal 18-2. After the lapse of another predetermined time, the setting unit 12 outputs the first signal stream with the signal value "1" to the terminal 18-1 and outputs the first signal stream with the signal value "0" to the terminal 18-2. After the lapse of still another predetermined time, the setting unit 12 outputs the first signal stream with the signal value "1" to the terminal 18-1 and outputs the first signal stream with the signal value "1" to the terminal 18-2. The setting unit 12 may output the first signal with the combinations of the signal values only once or repeatedly.

If the setting unit 12 closes the switches 14-1 to 14-3, the setting unit 12 outputs a first signal in three streams to the terminal 18-1 via the switch 14-1, to the terminal 18-2 via the switch 14-2, and to the terminal 18-3 via the switch 14-3. In the following detailed description, the phrase "via the switch 14" is omitted for the sake of brevity. First, the setting unit 12 outputs a first signal stream with the signal value "0" to the terminal 18-1, outputs a first signal stream with the signal value "0" to the terminal 18-2, and outputs a first signal stream with the signal value "0" to the terminal 18-3. After the lapse of a predetermined time, the setting unit 12 outputs the first signal stream with the signal value "0" to the terminal 18-1, outputs the first signal stream with the signal value "0" to the terminal 18-2, and outputs the first signal stream with the signal value "1" to the terminal 18-3. After the lapse of another predetermined time, the setting unit 12 outputs the first signal stream with the signal value "0" to the terminal 13-1, outputs the first signal stream with the signal value "1" to the terminal 16-2, and outputs the first signal stream with the signal value "0" to the terminal 18-3. After the lapse of still another predetermined time, the setting unit 12 outputs the first signal stream with the signal value "0" to the terminal 18-1, outputs the first signal stream with the signal value "1" to the terminal 18-2, and outputs the first signal stream with the signal value "1" to the terminal 18-3. After the lapse of still another predetermined time, the setting unit 12 outputs the first signal stream with the signal value "1" to the terminal 18-1, outputs the first signal stream with the signal value "0" to the terminal 18-2, and outputs the first signal stream with the signal value "0" to the terminal 18-3. After the lapse of still another predetermined time, the setting unit 12 outputs the first signal stream with the signal value "1" to the terminal 16-1, outputs the first signal stream with the signal value "0" to the terminal 18-2, and outputs the first signal stream with the signal value "1" to the terminal 18-3. After the lapse of still another predetermined time, the setting unit 12 outputs the first signal stream with the signal, value "1" to the terminal 18-1, outputs the first signal stream with the signal value "1" to the terminal 18-2, and outputs the first signal stream with the signal value "0" to the terminal 18-3. After the lapse of still another predetermined time, the setting unit 12 outputs the first signal stream with the signal value "1" to the terminal 18-1, outputs the first signal stream with the signal value "1" to the terminal 18-2, and outputs the first signal stream with the signal value "1" to the terminal 18-3. The setting unit 12 may output the first signal with the combinations of the signal values only once or repeatedly.

Referring to step S5, when the first signal with the signal value "0" is input from the switch 14-1 of the switching unit 13 to the storage unit 15, the storage unit 15 stores, in the first storage unit 16-1, the signal value "0" of the first signal input from the switching unit 13 and the signal value of the 7-bit second signal input from the signal output device 3, and stores the signal value of the input 7-bit second signal in the array portion of the third storage unit 16-3 corresponding to the first signal value "0". When the first signal with the signal value "1" is input from the switching unit 13 to the storage unit 15, the storage unit 15 stores, in the first storage unit 16-1, the signal value "1" of the first signal input from the switching unit 13 and the signal value of the 7-bit second signal input from the signal output device 3, and stores the signal value of the input 7-bit second signal in the array portion of the third storage unit 16-3 corresponding to the first signal value "1". Consequently, the third storage unit 16-3 can store the 14-bit third signal value. When the signal value of the input first signal and the signal value of the input second signal are stored in the first, storage unit 16-1, the signal value of the first signal and the signal value of the second signal previously stored are overwritten, if such exist. The same applies to the following.

When the first signal with the signal value "00" is input from the switching unit 13 to the storage unit 15, the storage unit 15 stores, in the first storage unit 16-1, the signal value "00" of the first signal input from the switching unit 13 and the signal value of the 6-bit second signal input from the signal output device 3, and stores the signal value of the input 6-bit second signal in the array portion of the fourth storage unit 16-4 corresponding to the first signal value "00". Note that the first signal value "00" is a combination of the signal values of the first signal from the switches 14-1 and 14-2, and consists of the signal value of the first signal stream from the switch 14-1 and the signal value of the first signal stream from the switch 14-2 in order from the left. When the first signal with the signal value "01" is input from the switching unit 13 to the storage unit 15, the storage unit 15 stores, in the first storage unit 16-1, the signal value "01" of the first signal input from the switching unit 13 and the signal value of the 6-bit second signal input from the signal output device 3, and stores the signal value of the input 6-bit second signal in the array portion of the fourth storage unit 16-4 corresponding to the first signal value "01". The same applies to the first signal values "10" and "11". Consequently, the fourth storage unit 16-4 can store the 24-bit third signal value.

When the first signal with the signal value "000" is input from the switching unit 13 to the storage unit 15, the storage unit 15 stores, in the first storage unit 16-1, the signal value "000" of the first signal input from the switching unit 13 and the signal value of the 5-bit second signal input from the signal output device 3, and stores the signal value of the input 5-bit second signal in the array portion of the fifth storage unit 16-5 corresponding to the first signal value "000". Mote that the first signal value "000" is a combination of the signal values of the first signal from the switches 14-1 to 14-3, and consists of the signal value of the first signal stream from the switch 14-1, the signal value of the first signal stream from the switch 14-2, and the signal value of the first signal stream from the switch 14-3 in order from the left. When the first signal with the signal value "001" is input from the switching unit 13 to the storage unit 15, the storage unit 15 stores, in the first storage unit 16-1, the signal value "001" of the first signal input from the switching unit 13 and the signal value of the 5-bit second signal input from the signal output device 3, and stores the signal value of the input 5-bit second signal in the array portion of the fifth storage unit 16-5 corresponding to the first signal value "001". The same applies to the first signal values "010", "011", "100", "101", "110", and "111". Consequently, the fifth storage unit 16-5 can store the 40-bit third signal value.

In a case where the second storage unit 16-2 includes the sixth storage unit, the storage unit 15 stores the signal values of the input second signal in order from the lower side in accordance with the first signal values. Even in this case, the second storage unit 16-2 of the storage unit 15 can store the third signal value of a number of bits corresponding to the number of bits of the signal values of the input second signal.

Returning back to FIG. 4, if the instruction signal indicates that no terminal 18 is to be used as DO in the variable terminal group 17 (step S2: No), the setting unit 12 opens all the switches 14-1 to 14-3 of the switching unit 13 (step S8). The storage unit 15 stores the signal value of the second signal input from the signal output device 3 in the first storage unit 16-1 (step S9).

After step S9 or after the first signal is output in all patterns (step S6: Yes), the setting unit 12 reads the signal value from the storage unit 15 on the basis of the instruction signal (step S10), and acquires information on the signal value of the second signal input from the signal output device 3 to the display device 1. Specifically, when the instruction signal indicates that at least one terminal 18 is used as DO in the variable terminal group 17, the setting unit 12 reads the third signal value from the second storage unit 16-2. When the instruction signal indicates that no terminal 18 is used as DO in the variable terminal group 17, the setting unit 12 reads the second signal value from the first storage unit 16-1. In a case where the second storage unit 16-2 includes the sixth storage unit and the sixth storage unit stores the 8-bit second signal value stored in the first storage unit 16-1 as the third signal value, the setting unit 12 reads the third signal value from the sixth storage unit of the second storage unit 16-2 regardless of the number of terminals 18 used as DO. The setting unit 12 sets the instrument number, using the read signal value (step S11). The setting unit 12 may use the read signal value as it is for the instrument number, or may perform a predetermined calculation using the read signal value and use the calculation result for the instrument number. Thus by reading the third signal value from the second storage unit 16-2, the setting unit 12 can set the instrument number using information of a larger number of bits than the number of terminals of the variable terminal group 17.

Figure 5:
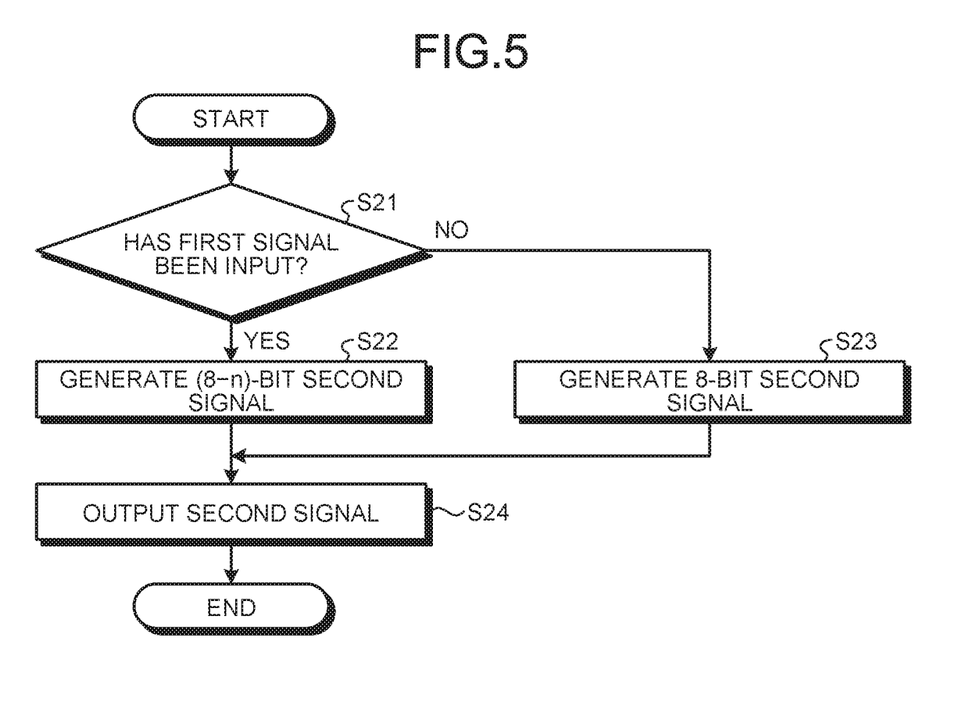
FIG. 5 is a flowchart illustrating an operation in which a signal output device outputs a signal.

FIG. 5 is a flowchart illustrating an operation in which the signal output device 3 according to the present embodiment outputs a signal. In the signal output device 3, the signal detection unit 31 checks whether a first signal has been input from the display device 1 (step S21). Note that the signal detection unit 31 can determine whether the display device 1 is connected to the signal output device 3, by checking the state, i.e. voltage value, of the terminals 35-1 to 35-3 to which a first signal may be input. If a first signal has been input (step S21: Yes) the signal generation unit 32 generates an (8-n)-bit second signal, where n is the number of streams of the first signal input (step S22). In the present embodiment, the value of n is one, two, or three. If a first signal has not been input (step S21: No), the signal generation unit 32 generates an 3-bit second signal (step S23). The output control unit 33 outputs the second signal generated by the signal generation unit 32, to the display device 1 via the terminal group 34 (step S24).

Next, the hardware configuration of the control unit 10 in the display device 1 will be described. In the display device 1, the control unit 10 is implemented by a processing circuit. That is, the display device 1 includes a processing circuit for increasing the number of bits of information to be used without increasing the number of terminals. The processing circuit may be a memory and a processor that executes a program stored in the memory, or may be dedicated hardware.

Figure 6:
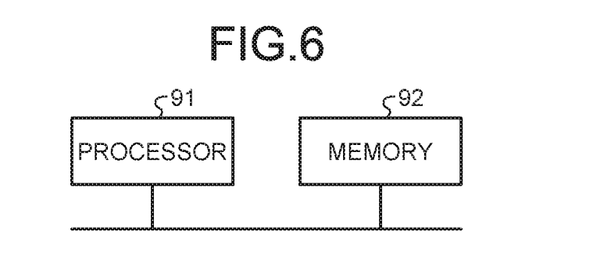
FIG. 6 is a diagram illustrating an exemplary case where the processing circuit of a display device is configured with a processor and a memory.

FIG. 6 is a diagram illustrating an exemplary case where the processing circuit of the display device 1 according to the present embodiment is configured with a processor and a memory. In a case where the processing circuit is configured with the processor 91 and the memory 92, each function of the processing circuit of the display device 1 is implemented by software, firmware, or a combination of software and firmware. Software or firmware is described as programs and stored in the memory 92. In the processing circuit, the processor 91 reads and executes the programs stored in the memory 92, thereby implementing each function. That is, the processing circuit includes the memory 92 for storing programs that are executed to eventually increase the number of bits of information to be used without increasing the number of terminals. It can also be said that these programs cause a computer to execute the procedures and methods for the display device 1.

The processor 91 may be a central processing unit (CPU), a processing device, an arithmetic device, a microprocessor, a microcomputer, or a digital signal processor (DSP). Examples of the memory 92 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

Figure 7:
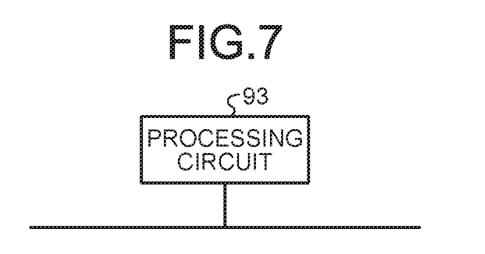
FIG. 7 is a diagram illustrating an exemplary case where the processing circuit of a display device is configured with dedicated hardware.

FIG. 7 is a diagram illustrating an exemplary case where the processing circuit of the display device 1 according to the present embodiment is configured with dedicated hardware. In a case where the processing circuit is configured with dedicated hardware, the processing circuit 93 illustrated in FIG. 7 corresponds, for example, to a single circuit, a composite circuit, a programmed processor, a parallel programmed processor, an application specific integrated circuit (ASIC), a field programmable gate array (FPGA), or a combination thereof. The functions of the display device 1 may be implemented by the processing circuit 93 separately or collectively.

Note that some of the functions of the display device 1 may be implemented by dedicated hardware, and the other functions may be implemented by software or firmware. In this manner, the processing circuit can implement the above-described functions using dedicated hardware, software, firmware, or a combination thereof.

As with the control unit 10, the setting method instruction unit 20 of the display device 1 can be implemented by the processing circuit illustrated in FIG. 6 or 7. The setting method instruction unit 20 may be in the form of a small instrument that is removably attached to the display device 1 as described above. As with the display device 1, the signal output device 3 can be implemented by the processing circuit illustrated in FIG. 6 or 7.

As described above, according to the present embodiment, in the display device 1, the control unit 10 includes the terminals 18 that can be used as DI or DO. When one or more terminals 18 are used as DO, the second signal corresponding to the first signal output from the terminals 18 is input from the signal output device 3, and the instrument number of identification information is set using a plurality of second signals input from the signal output device 3. Consequently, the control unit 10 can increase the number of bits of information that can be used for setting the instrument number without increasing the number of terminals for capturing the value of each bit of the second signal input from the signal output device 3.

In the above description, a display device is used as an on-board instrument mounted on a train, which is only an example. An on-board instrument may be an air-conditioning device, a communication device, etc. In the display device 1, the value of each bit obtained without increasing the number of terminals with the method described in the present embodiment, that is, information on the signal value of the second signal input from the signal output device 3 to the display device 1, can be used for applications other than the setting of the instrument number.

The configurations described in the above-mentioned embodiment indicate examples of the contents of the present invention. The configurations can be combined with another well-known technique, and some of the configurations can be omitted or changed in a range not departing from the gist of the present invention.

REFERENCE SIGNS LIST 1, 1-1 to 1-3 display device; 2 cable; 3 signal output device; 4 on-board instrument setting system; 10 control unit; 12 setting unit; 13 switching unit; 14-1 to 14-3 switch; IS storage unit; 16-1 first storage unit; 16-2 second storage unit; 16-3 third storage unit; 16-4 fourth storage unit; 16-5 fifth storage unit; 17 variable terminal group; 18-1 to 18-3, 19-1 to 19-5, 35-1 to 35-8 terminal; 20 setting method instruction unit; 30, 40, 50 connector; 31 signal detection unit; 32 signal generation unit; 33 output control unit; 34 terminal group.

The invention claimed is:

1. An on-board instrument comprising:
a variable terminal group including one or more first terminals each usable as an input terminal or an output terminal and one or more second terminals each usable as an input terminal;
switching circuitry to switch the first terminals to the input terminal or the output terminal;
setting circuitry to control the switching circuitry on a basis of an instruction signal indicating the number of first terminals to be used as the output terminal, and if at least one of the first terminals is used as the output terminal, output a first signal to the first terminal that is used as the output terminal via the switching circuitry; and
storage circuitry capable of storing a second signal value and a third signal value, the second signal value being a signal value of a second signal input from the input terminal, the third signal value being a signal value obtained by arraying a plurality of the second signal values on the basis of a first signal value that is a signal value of the first signal, wherein
the setting circuitry reads the second signal value or the third signal value from the storage circuitry on the basis of the instruction signal, and acquires information on the signal value of the second signal input.

2. The on-board instrument according to claim 1, wherein the storage circuitry includes:
a first storage circuit to store the second signal value, the first storage circuit being capable of storing the signal value of the second signal of a number of bits, the number being equal to the total number of first terminals and second terminals of the variable terminal group; and a second storage circuit to store the third signal value obtained by arraying the second signal value stored in the first storage circuit at a position designated by the first signal value, and on the basis of the instruction signal, the setting circuitry reads the second signal value from the first storage circuit or reads the third signal value from the second storage circuit.

3. The on-board instrument according to claim 1, wherein the setting circuitry switches the signal value of the first signal for output after a lapse of a predetermined time.

4. An on-board instrument setting system comprising:
an on-board instrument comprising:
  a variable terminal group including one or more first terminals each usable as an input terminal or an output terminal and one or more second terminals each usable as an input terminal;
  switching circuitry to switch the first terminals to the input terminal or the output terminal;
  setting circuitry to control the switching circuitry on a basis of an instruction signal indicating the number of first terminals to be used as the output terminal, and if at least one of the first terminals is used as the output terminal, output a first signal to the first terminal that is used as the output terminal via the switching circuitry; and
  storage circuitry capable of storing a second signal value and a third signal value, the second signal value being a signal value of a second signal input from the input terminal, the third signal value being a signal value obtained by arraying a plurality of the second signal values on the basis of a first signal value that is a signal value of the first signal, wherein
  the setting circuitry reads the second signal value or the third signal value from the storage circuitry on the basis of the instruction signal, and acquires information on the signal value of the second signal input; and
a signal output device to output a second signal to the on-board instrument, the signal output device comprising:
  signal detection circuitry to detect a first signal output from the on-board instrument;
  signal generation circuitry to determine the number of streams of the second signal to be generated on the basis of the number of streams of the first signal detected by the signal detection circuitry, and generate the second signal for each signal value of the first signal detected by the signal detection circuitry; and
  output control circuitry to perform control to output the second signal generated by the signal generation circuitry from a terminal other than the terminal at which the first signal has been detected by the signal detection circuitry.

5. The on-board instrument setting system of claim 4, wherein:
  the on-board instrument transmits a first signal to the signal output device, and the signal output device generates a second signal on the basis of the number of streams and signal value of the first signal input from the on-board instrument, and outputs the second signal to the on-board instrument.

6. A signal value information acquisition method for an on-board instrument, the on-board instrument including
  a variable terminal group including one or more first terminals each usable as an input terminal or an output terminal and one or more second terminals each usable as an input terminal,
  the method comprising:
  controlling, on a basis of an instruction signal indicating the number of first terminals to be used as the output terminal, switching circuitry to switch the first terminals to the input terminal or the output terminal, and if at least one of the first terminals is used as the output terminal, outputting a first signal to the first terminal that is used as the output terminal via the switching circuitry;
  storing, a second signal value and a third signal value in storage circuitry, the second signal value being a signal value of a second signal input from the input terminal, the third signal value being a signal value obtained by arraying a plurality of the second signal values on the basis of a first signal value that is a signal value of the first signal; and
  reading, the second signal value or the third signal value from the storage circuitry on the basis of the instruction signal, and acquiring information on the signal value of the second signal input.

7. The signal value information acquisition method according to claim 6, wherein
  the storage circuitry includes:
  a first storage circuit to store the second signal value, the first storage circuit being capable of storing the signal value of the second signal of a number of bits, the number being equal to the total number of first terminals and second terminals of the variable terminal group; and
  a second storage circuit to store the third signal value obtained by arraying the second signal value stored in the first storage circuit at a position designated by the first signal value, and
  reading the second signal value or the third signal value from the storage circuitry on the basis of the instruction signal and acquiring information on the signal value of the second signal input comprise reading, on the basis of the instruction signal, the second signal value from the first storage circuit or reading the third signal value from the second storage circuit.

8. The signal value information acquisition method according to claim 6, wherein
  outputting the first signal to the first terminal that is used as the output terminal via the switching circuitry comprises switching the signal value of the first signal for output after a lapse of a predetermined time.

* * * * *